(12) United States Patent
Mamtimin et al.

(10) Patent No.: US 11,681,069 B1
(45) Date of Patent: Jun. 20, 2023

(54) PULSED NEUTRON TOOL FOR ELEMENTAL DECAY LOGGING

(71) Applicant: Halliburton Energy Services, Inc., Houston, TX (US)

(72) Inventors: Mayir Mamtimin, Spring, TX (US); Jeffrey James Crawford, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/646,748

(22) Filed: Jan. 3, 2022

(51) Int. Cl.
*G01V 5/10* (2006.01)

(52) U.S. Cl.
CPC .................... *G01V 5/102* (2013.01)

(58) Field of Classification Search
CPC . G01V 5/102; G01V 5/12; G01V 5/04; G01V 5/10
See application file for complete search history.

(56) References Cited

U.S. PATENT DOCUMENTS

| | | | |
|---|---|---|---|
| 4,464,569 A * | 8/1984 | Flaum | G01V 5/102 250/269.6 |
| 5,081,351 A | 1/1992 | Roscoe et al. | |
| 5,105,080 A | 4/1992 | Stoller et al. | |
| 2009/0026359 A1 | 1/2009 | Stephenson et al. | |
| 2009/0224146 A1 * | 9/2009 | Gilchrist | G01V 5/102 250/269.7 |
| 2011/0198489 A1 | 8/2011 | Roberts | |
| 2014/0001350 A1 | 1/2014 | Beekman et al. | |

OTHER PUBLICATIONS

PCT Application No. PCT/US2022/070011, International Search Report and Written Opinion, dated Sep. 19, 2022, 10 pages.

* cited by examiner

*Primary Examiner* — David P Porta
*Assistant Examiner* — Fani Polyzos Boosalis
(74) *Attorney, Agent, or Firm* — Delizio, Peacock, Lewin & Guerra

(57) ABSTRACT

In some embodiments, a method includes emitting, from a transmitter positioned in a wellbore formed in a subsurface formation, a pulse of neutrons into the subsurface formation and detecting gamma ray emissions at a near field and a far field generated in response to the pulse of neutrons being emitted into the subsurface formation. The method includes determining a single elemental decay for one chemical element of a number of chemical elements present in the subsurface formation based on the gamma ray emissions and determining at least one geophysical property of the subsurface formation based on the single elemental decay of the one chemical element.

20 Claims, 7 Drawing Sheets

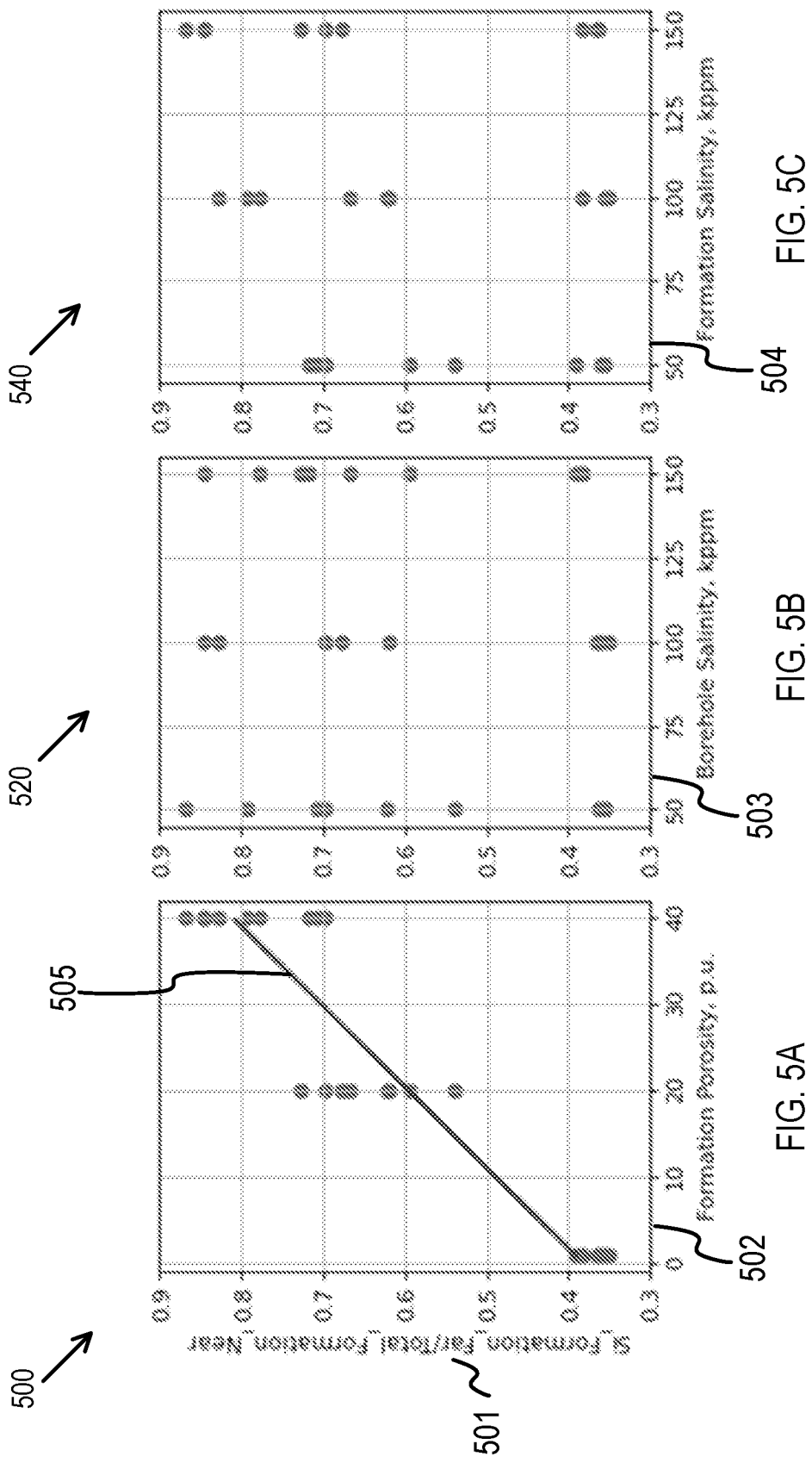

PULSED NEUTRON TOOL FOR ELEMENTAL DECAY LOGGING

BACKGROUND

The disclosure generally relates to evaluation of subsurface formation, and more particularly, a pulsed neutron tool for elemental decay logging for formation evaluation.

In the field of logging (e.g., wireline logging, logging while drilling (LWD)), neutron tools have been used to extract petrophysical properties of a subsurface formation. In neutron capture mode, a transient decay curve can be used to correlate neutron intensity drop-off with respect to the neutron diffusion due to moderation and capture. Traditionally, only bulk count rate from the capture mode is used to construct a transient decay curve to extract a near-field time decay constant and a far-field time decay constant.

BRIEF DESCRIPTION OF THE DRAWINGS

Embodiments of the disclosure may be better understood by referencing the accompanying drawings.

FIGS. 5A-5C depict example plots of an elemental decay ratio plotted against formation porosity, wellbore salinity, and formation salinity, respectively, according to some embodiments.

DESCRIPTION OF EMBODIMENTS

The description that follows includes example systems, methods, techniques, and program flows that embody embodiments of the disclosure. However, it is understood that this disclosure may be practiced without these specific details. For instance, this disclosure refers to salinity-independent formation property evaluation in illustrative examples. Example embodiments can also be applied to pulsed neutron spectroscopy to evaluate an elemental composition of a wellbore fluid and/or formation fluid. In other instances, well-known instruction instances, protocols, structures and techniques have not been shown in detail in order not to obfuscate the description.

Example embodiments can be used for various downhole well logging applications for evaluation of the subsurface formation. Example embodiments can include elemental decay logging using a pulsed neutron tool. In some embodiments, gamma rays generated from a pulse of neutrons being emitted into the subsurface formation can be detected. These gamma rays can include elemental gamma ray peaks that can be used to correlate to one or more formation properties (such as porosity, formation sigma, etc.). In some embodiments, this correlation can be essentially independent of salinity.

In some embodiments, characteristic captured gamma peaks from each element can be traced separately in time to construct a transient decay curve elementally. Such embodiments can improve current transient analysis because individual elemental results can be determined in addition to the bulk transient behavior.

Example System

Figure 1:
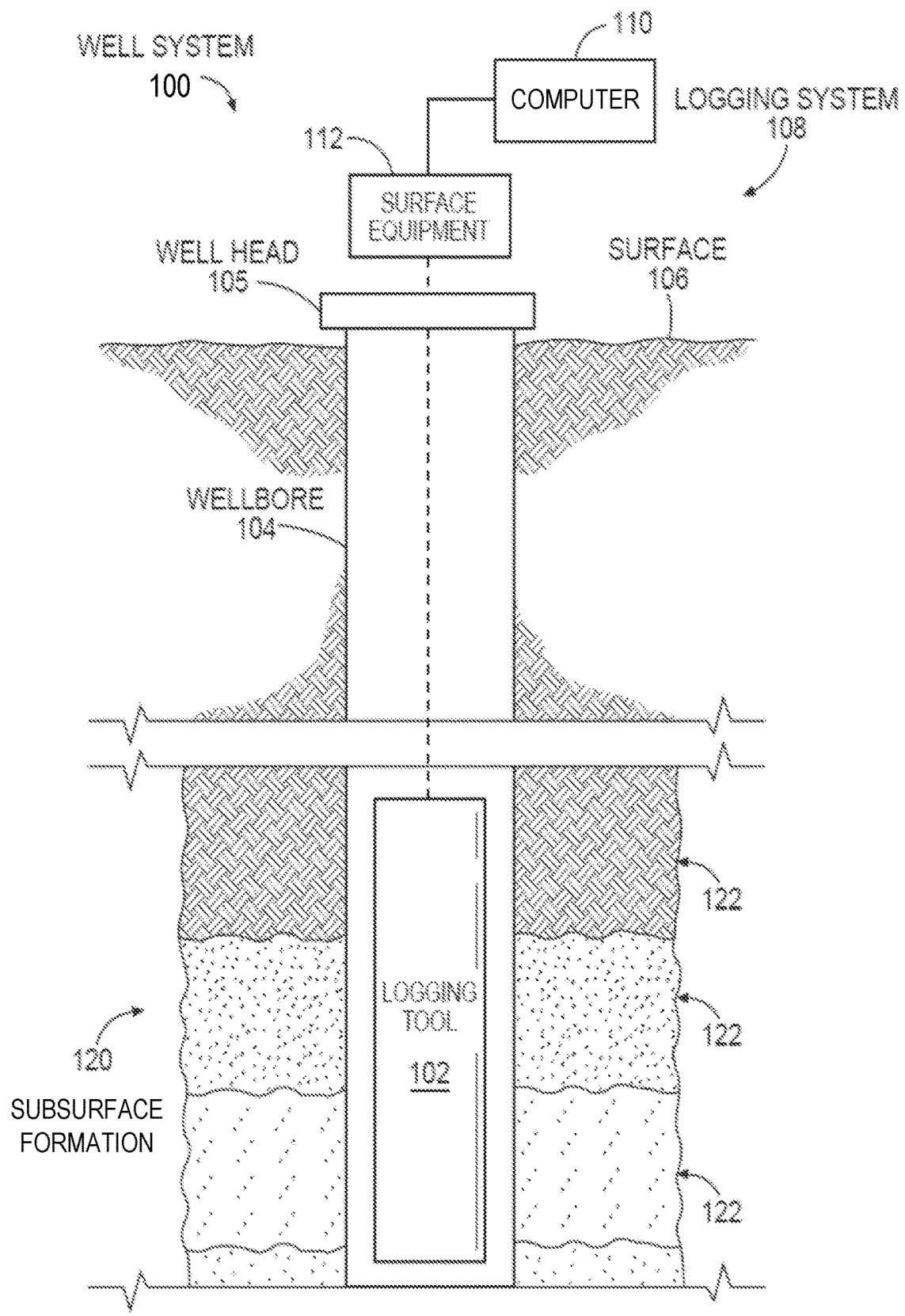
FIG. 1 depicts an example operation of a logging tool disposed in a wellbore of a subsurface formation, according to some embodiments.

FIG. 1 depicts an example operation of a logging tool disposed in a wellbore of a subsurface formation, according to some embodiments. An example well system 100 includes a pulsed neutron logging system 108 and a subsurface formation 120 beneath the ground surface 106. The well system 100 can include additional or different features that are not shown in FIG. 1. For example, the well system 100 may include additional drilling system components, wireline logging system components, etc.

The subsurface formation 120 can include all or part of one or more subterranean formations or zones. The example subsurface formation 120 shown in FIG. 1 includes multiple subsurface zones 122 and a wellbore 104 penetrated through the subsurface zones 122. The subsurface zones 122 can include sedimentary layers, rock layers, sand layers, or combinations of these and other types of subsurface layers. One or more of the subsurface zones can contain fluids, such as brine, oil, gas, etc. Although the example wellbore 104 shown in FIG. 1 is a vertical wellbore, example embodiments can be implemented in other wellbore orientations. For example, example embodiments may be adapted for horizontal wellbores, slanted wellbores, curved wellbores, vertical wellbores, or combinations of these.

The pulsed neutron logging system 108 includes a logging tool 102, surface equipment 112, and a computer 110. In the example shown in FIG. 1, the logging tool 102 is a downhole pulsed neutron logging tool that operates while disposed in the wellbore 104. The example surface equipment 112 shown in FIG. 1 operates at or above the surface 106, for example, near the well head 105, to control the pulsed neutron logging tool 102 and possibly other downhole equipment or other components of the well system 100. The example computer 110 can receive and analyze logging data from the logging tool 102. The pulsed neutron logging system 108 can include additional or different features, and such features can be arranged and operated as represented in FIG. 1 or in another manner.

In some instances, all or part of the computer 110 can be implemented as a component of, or can be integrated with one or more components of, the surface equipment 112, the logging tool 102 or both. In some cases, the computer 110 can be implemented as one or more computing structures separate from the surface equipment 112 and the logging tool 102.

In some implementations, the computer 110 is embedded in the logging tool 102, and the computer 110 and the logging tool 102 can operate concurrently while disposed in the wellbore 104. For example, although the computer 110 is shown above the surface 106 in the example shown in FIG. 1, all or part of the computer 110 may reside below the surface 106, for example, at or near the location of the logging tool 102.

The well system 100 can include communication or telemetry equipment that allows communication among the computer 110, the logging tool 102, and other components of the pulsed neutron logging system 108. For example, the components of the logging system 108 can each include one or more transceivers or similar apparatus for wired or wireless data communication among the various components. For example, the logging system 108 can include systems and apparatus for optical telemetry, wireline telemetry, wired pipe telemetry, mud pulse telemetry, acoustic telemetry, electromagnetic telemetry, or a combination of these and other types of telemetry. In some cases, the logging tool 102 receives commands, status signals, or other types of information from the computer 110 or another source. In some cases, the computer 110 receives logging data, status signals, or other types of information from the logging tool 102 or another source.

Pulsed neutron logging operations can be performed in connection with various types of downhole operations at various stages in the lifetime of a well system. Structural attributes and components of the surface equipment 112 and logging tool 102 can be adapted for various types of well logging operations. For example, pulsed neutron logging may be performed during drilling operations, during wireline logging operations, or in other contexts. As such, the surface equipment 112 and the logging tool 102 may include, or may operate in connection with drilling equipment, wireline logging equipment, or other equipment for other types of operations.

In some implementations, the logging tool 102 includes a chemically sealed neutron source such as Americium-241/Beryllium (AmBe). The neutron source can be placed near the bottom of the pulsed neutron logging tool with near-field and far-field gamma ray detectors spaced at offset distances from the neutron source.

In some implementations, the logging tool 102 includes a pulsed neutron logging tool comprising a neutron source and at least two detectors for obtaining gamma ray measurements from the subsurface formation 120. For example, in FIG. 1, the logging tool 102 can be suspended in the wellbore 104 by a coiled tubing, wireline cable, or another structure that connects the tool to a surface control unit or other components of the surface equipment 112. In some example implementations, the logging tool 102 is lowered to the bottom of a region of interest and subsequently pulled upward (e.g., at a substantially constant speed) through the region of interest. As shown, for example, in FIG. 6, a logging tool 602 can be deployed in a wellbore 604 on jointed drill pipe, hard wired drill pipe, or other deployment hardware. In some example implementations, the logging tool 602 collects data during drilling operations as it moves downward through the region of interest. In some example implementations, the logging tool 602 collects data while a drill string 640 is moving, for example, while it is being tripped in or tripped out of the wellbore 604.

In some implementations, the logging tool 102 collects data at discrete logging points in the wellbore 104. For example, the logging tool 102 can move upward or downward incrementally to each logging point at a series of depths in the wellbore 104. At each logging point, instruments in the logging tool 102 perform measurements on the subsurface formation 120. The measurement data can be communicated to the computer 110 for storage, processing, and analysis. Such data may be gathered and analyzed during drilling operations (e.g., during logging while drilling (LWD) operations), during wireline logging operations, or during other types of activities.

The computer 110 can receive and analyze the measurement data from the logging tool 102 to detect properties of various subsurface zones 122. For example, the computer 110 can identify the sigma, water saturation, oil saturation, material content, or other properties of the subsurface zones 122 based on measurements acquired by the logging tool 102 in the wellbore 104.

The computer 110 can further total the number of gamma ray emissions from subsurface layers 122. For example, the computer 110 can capture gamma ray emission signatures from various elemental species over time and determine a total capture gamma count from the subsurface layers 122 based on the measurements acquired by the near and far field detectors of the logging tool 102 in the wellbore 104.

The acquired gamma ray emission signatures (or other logging data) may be processed (e.g., totaled, classified, etc.) to a total count rate decay and/or a count rate decay pertaining to a singular element which can be further modeled to a transient decay curve (e.g., a distribution of gamma ray emissions of the near field and the far field over time). The transient decay curve(s) can be used to determine various physical properties of the formation by solving one or more inverse problems. In some cases, capture gamma emissions comprising the total count rate decay and/or an elemental count rate decay are acquired for multiple logging points and/or multiple gamma ray emission signatures are used to train a model classifying a series of elemental species present in the subsurface formation. In some cases, capture gammas emissions are plotted to transient decay curves for multiple logging points and can be used to predict properties of the subsurface formation.

Example Operations

Figure 2:
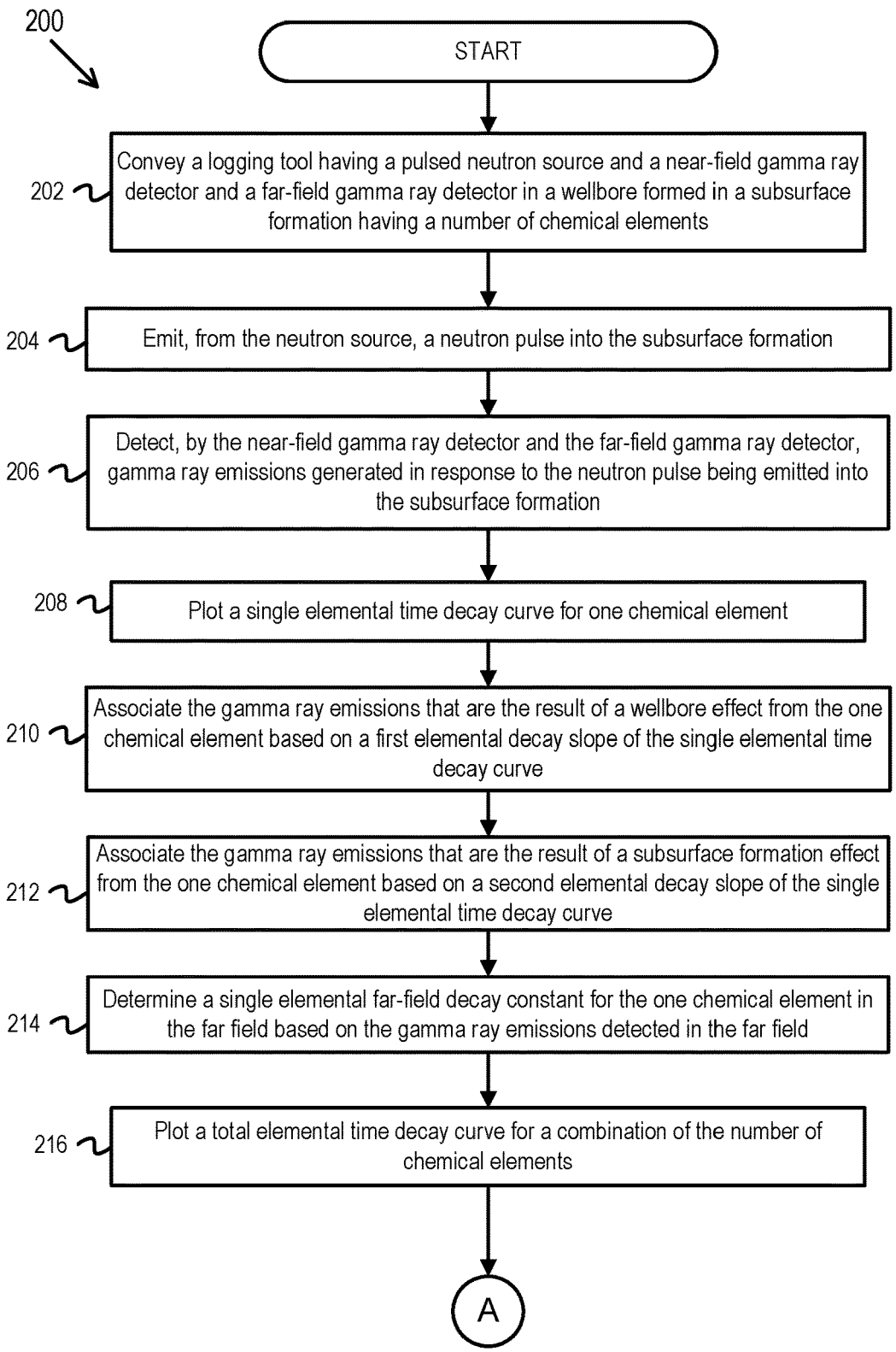
FIGS. 2-3 depict a flowchart of example operations for neutron logging to measure elemental decay, according to some embodiments.
Figure 3:
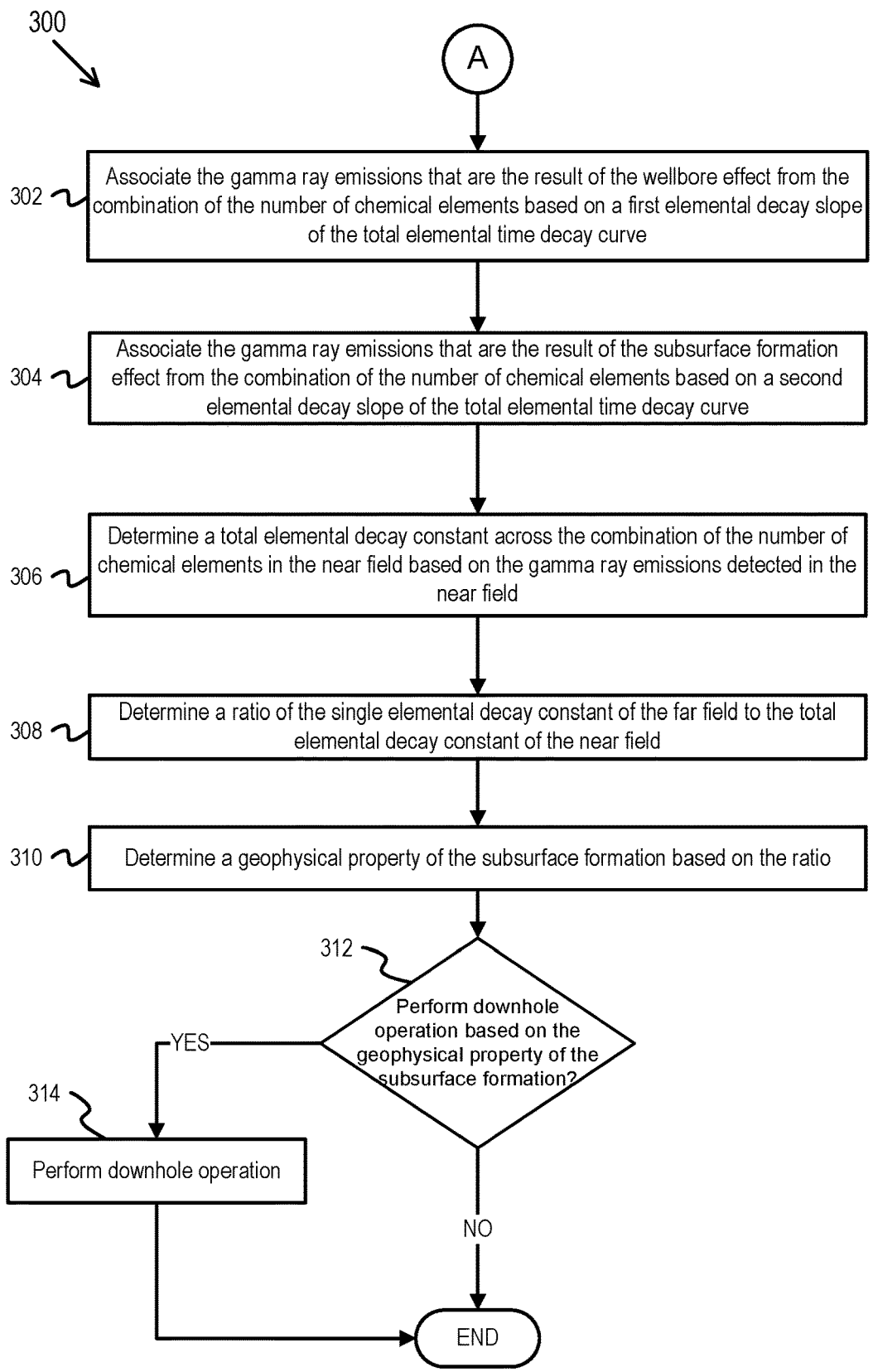

Example operations are now described. FIGS. 2-3 depict a flowchart of example operations for performing neutron logging to measure elemental decay, according to some embodiments. FIGS. 2-3 depict a flowchart 200 and a flowchart 300, respectively, having operations that include a transition point A for operations to move between the flowchart 200 and the flowchart 300. Operations of the flowchart 200-300 can be performed by software, firmware, hardware or a combination thereof. Such operations are described with reference to the system of FIG. 1. However, such operations can be performed by other systems or components. For example, at least some of the operations of the flowcharts 200-300 are described as being performed by a computer at a surface of the wellbore. In some embodiments, one or more of these operations can be performed by a computer at the surface and/or downhole in the wellbore. The operations of the flowchart 200 start at block 202.

At block 202, a logging tool having a pulsed neutron source, a near-field gamma ray detector, and a far-field gamma ray detector is conveyed into a wellbore formed in a subsurface formation having a number of chemical elements. For example, with reference to FIG. 1, the logging tool 102 of logging system 108 is conveyed into the wellbore 104 formed in the subsurface formation 120 having a number of chemical elements. The neutron source of the pulsed neutron logging tool can be disposed proximate to a zone of interest as part of different downhole configurations and operations (e.g., open hole, cased, drilling, wireline, production, etc.). For example, with reference to FIG. 1, the logging tool 102 can be disposed proximate to a subsurface zone 122 of interest within the subsurface formation 120. The neutron source can be electronically activated to emit high-energy neutrons (~14 Mega electron-volts (MeV) outward from the tool in different azimuthal directions for each pulse.

At block 204, a neutron pulse is emitted into the subsurface formation from the neutron source of the logging tool. For example, with reference to FIG. 1, the neutron source disposed on the logging tool 102 can emit the neutron pulse into the subsurface formation 120. Once electronically activated, the neutron source emits neutrons into the formation in multiple azimuthal directions. The neutrons propagate throughout the formation rock and lose energy as they travel through the medium. The neutrons collide with atoms and molecules comprising the formation fluid until their energy lowers substantially, (i.e., decays). In this low energy state, nuclei of the formation fluid can absorb the neutrons. When a nucleus of a specific element absorbs a neutron, it emits a characteristic capture gamma ray peak of a specific energy level. These characteristic capture gamma peaks can be traced through time to construct a transient decay curve for each detected element.

Certain elements will absorb the neutrons at a higher rate than others. For instance, chlorine is an example of a primary absorbing element of neutrons in pulsed neutron logging operations. Chlorine presence in formation fluid or the wellbore can be attributed to high concentrations of salt, essentially creating brines. The brines possess high concentrations of chlorides. Presence of chlorine in the formation fluid can dominate a total count rate decay of the gamma emissions because chlorine has a strong decay signal. Thus, presence of chlorine in the total count rate decay may skew a resultant value of formation sigma and further skews data used for evaluating each subsurface zone of interest. Some embodiments include elemental transient analysis to more accurately evaluate formation properties and a formation sigma by removing the influence of salinity/chlorine from the obtained data.

At block 206, the near-field gamma ray detector and the far-field gamma ray detector detect gamma ray emissions generated in response to the neutron pulse emitted from the neutron source into the subsurface formation. For example, with reference to FIG. 1, the detectors disposed on the logging tool 102 can detect these gamma ray emissions from the subsurface formation 120. As neutrons are captured by nuclei of the formation fluid, the near-field gamma ray detector and the far-field gamma ray detector ("gamma ray detectors") detect the gamma ray emissions of neutron-capturing nuclei. The detected gamma ray emissions can be incorporated into a total gamma ray count rate or distilled down to component elemental species. The near-field gamma ray detector is intended to detect gamma ray emissions in the near-field (wellbore and partially into the formation) whereas a far-field detector is purposed to detect gamma ray emissions from the subsurface formation and nuclei within the formation fluid at a substantially farther radius from the logging tool than the near-field gamma ray detector. The gamma ray emissions detected by the near-field and far-field gamma ray detectors can be analyzed (including both an energy level and count rate). The energy level can be used to identify which element released the gamma ray. The count rate can be used to quantify how much of the element is present.

Figure 4B:
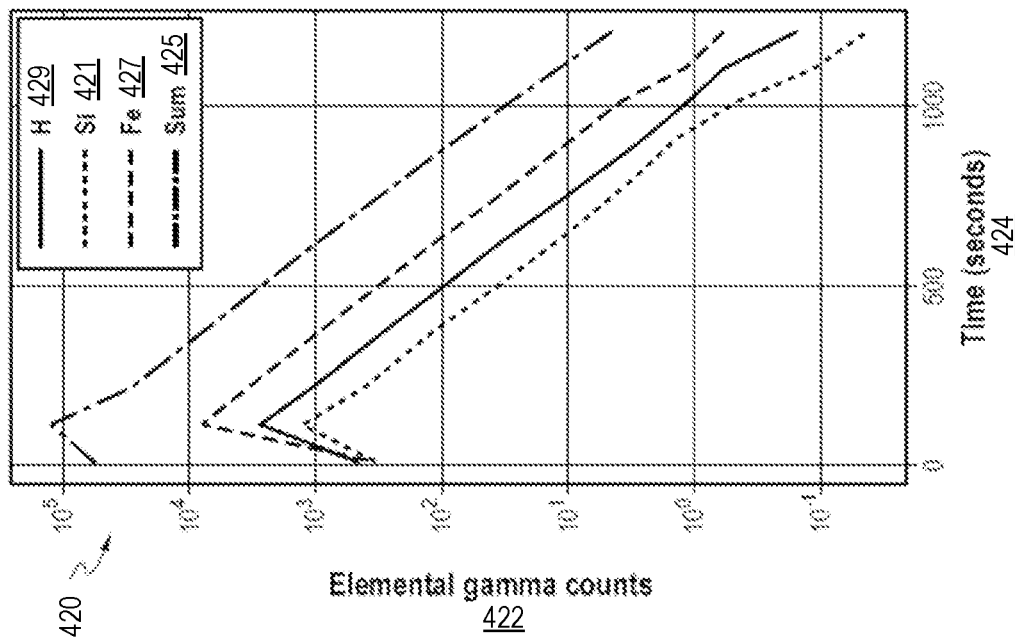
FIGS. 4A-4B depict example plots of transient decay curves, according to some embodiments.
Figure 4A:
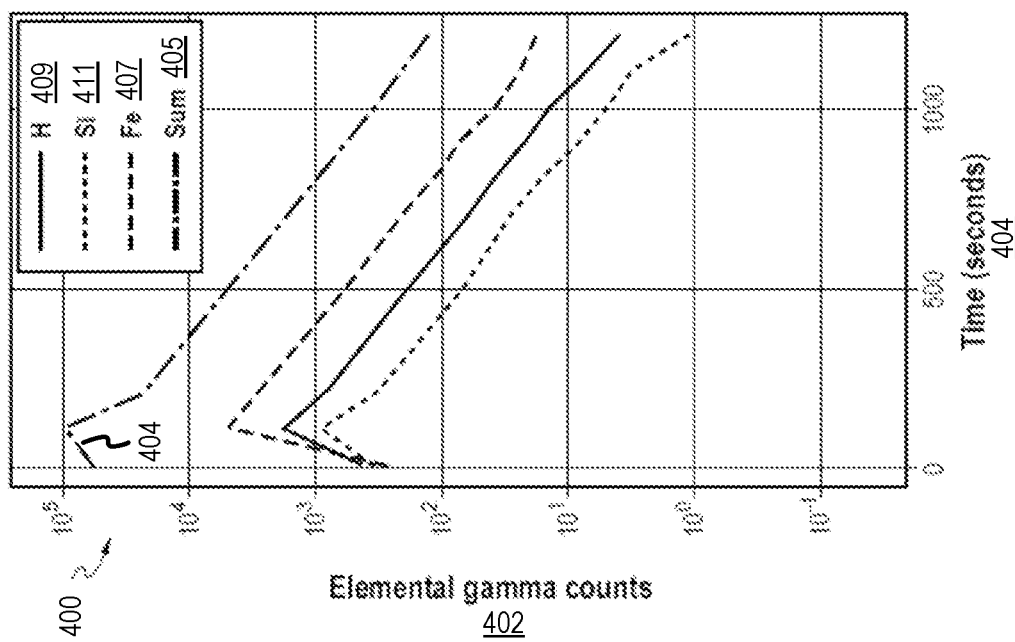

At block 208, a single elemental time decay curve is plotted for one chemical element. For example, with reference to FIG. 1, the computer 110 can perform this operation. To help illustrate, FIGS. 4A-4B depict example plots of elemental time decay curves, according to some embodiments. FIG. 4A includes a plot 400 comprising an x-axis 404 that is a decay time in microseconds after a neutron pulsed has ceased, a y-axis 402 that is an elemental gamma count of capture gammas detected by the detectors, and elemental time decay curves 405, 407, 409, and 411. The plot 400 also depicts an initial positive slope 404, wherein this positive slope is present across curves 405 (a summation curve of across a set range of gamma peaks, effectively a total elemental time decay curve), 407 (iron), 409 (hydrogen), and 411 (silicon), and the initial positive slope 404 is a result of prompt inelastic scattering of neutrons by a target nucleus. Scattering results in little to no delay of gamma ray emissions which explains the peak on each curve corresponding to when the near-field detector counts a large number of capture gamma rays soon after the neutron source emits a neutron pulse. In a total count rate decay curve 405, for example, the initial positive slope 404 corresponding to prompt reactions quickly subsides to a decreasing slope in which the count of capture gammas decreases (decays) with respect to time.

FIG. 4B includes a plot 420 comprising elemental time decay curves 421, 425, 427, and 429 similar to those of the plot 400. The plot 420 further includes an x-axis 424 which models time in microseconds and a y-axis 422 which measures the elemental gamma count of capture gammas similar to y-axis 402. However, the plot 400 comprises shallower sloping time decay curves than the plot 420 because the wellbore and the formation are comprised of a similar material. The plot 420 depicts steeper sloping time decay curves, wherein the formation is comprised of more dense material that of the wellbore. For example, the material of the formation can be a low-porosity, low-permeability shale formation. FIGS. 4A-4B illustrate a contrasting effect on elemental time decay when a wellbore and formation content change independently of one another. Referring back to block 208, any of the elemental time decay curves comprising a single element (i.e., 407, 409, 411, 421, 427, 429) may be plotted as the single elemental time decay curve. In example embodiments, silicon is used as the one element for which analyses will be derived from. In some embodiments, the one chemical element of the single elemental time decay curve may be selected based on its presence in the formation (far field) and a lack of or minimal presence in the wellbore (near field). Returning to the description of the flowchart 200 of FIG. 2, operations of the flowchart 200 continue at block 210.

At block 210, gamma ray emissions from the one chemical element that are the result of a wellbore effect are associated with a first elemental decay slope of the single elemental time decay curve. For example, with reference to FIG. 1, the computer 110 can make this association by correlating the elemental gamma counts to specific instances of time. Referring now to FIGS. 4A-4B, each of the elemental time decay curves 405, 407, 409, 411, 421, 425. 427 and 429 of the plots 400 and 420, respectively, comprise elemental time decay data of both the near field and the far field, wherein a specific instance in time shows a transition from the near field (wellbore) to the far field (formation). After the initial positive slope 404, elemental capture gamma counts begin to decay as expected. A decreasing section comprising two distinct slopes can be seen across the time decay curves, wherein the two distinct slopes are separated at an inflection point. The inflection point is most visible in the total time decay curve 405 near t=200. This inflection point is representative of a boundary between the wellbore and the formation, i.e., the wellbore wall. From t=100 to approximately t=200, the slope of each curve correlates to a decay constant corresponding to a near-field gamma ray response, whereas the slope after the inflection at t=200 is indicative of a decay constant of the far-field, i.e., of the formation and formation fluid. Thus, the inflection point of each of the curves shows a physical layering of the sampling volume indicating wellbore and formation effects.

The elemental decay constants of each slope (i.e., each elemental time decay curve will comprise two of them—one in the near field and one in the far field) can be used to evaluate properties of both the wellbore and the formation, as well as elemental concentrations in the wellbore and in the formation. The elemental concentrations may provide valuable information; for example, a fast time decay of carbon may signify a presence of carbon in the wellbore, and an elemental time decay of chlorine in the wellbore and formation can be used to describe wellbore and formation salinity, respectively. Referring to the operation of block 210 with silicon as the one chemical element, the first elemental decay slope from roughly t=100 to t=200 is associated with the gamma ray emissions resulting from the wellbore effect of the near field.

At block 212, gamma ray emissions from the one chemical element that are the result of a subsurface formation effect are associated with a second elemental decay slope of the single elemental time decay curve. For example, with reference to FIG. 1, the computer 110 can make this association. Continuing the example with silicon and referring again to FIGS. 4A-4B, the slope occurring after the inflection point of t=200 in each curve is a result of neutrons propagating through the formation, being captured by nuclei, and the nuclei of the formation subsequently emitting the gamma ray emissions upon neutron capture. This second slope, occurring after the first, near-field slope of block 210, can be correlated to the far field.

At block 214, a single elemental far-field decay constant for the one chemical element is determined in the far field based on the gamma ray emissions detected in the far field. For example, with reference to FIG. 1, the computer 110 can determine the far-field decay constant. The elemental time decay curves of FIGS. 4A-4B exhibit an exponential decay which can be modeled by the following equation:

$$f(t)=e^{-\alpha t} \qquad (1)$$

wherein f(t) is the function of each elemental time decay curve with respect to time, t is time in microseconds, and alpha (α) is the elemental decay constant. The decay constant characterizes a rate of decay for each of the slopes of each curve. The inflection point of each curve can essentially divide each of the single elemental time decay curves into two distinctly sloping curves modeled by different functions and thus a different decay constant. Inverting this equation and solving for alpha for the far-field (second slope) of one of the elemental time decay curves of FIGS. 4A-4B based on the gamma ray emissions detected in the far field grants a single elemental far-field decay constant. Continuing the example, a single elemental far-field decay constant for silicon can be determined from Equation (1). This decay constant of the far field can be absent of wellbore effects. Using an element largely exclusive to the formation such as silicon also improves data quality, as the data will not be affected by chlorine presence like the total elemental decay curve and total elemental decay constants. While silicon is used in example embodiments, other elements present in the formation (far field) and not present in the wellbore (near field) such as calcium, magnesium, iron, and others may be used in place of silicon as the one selected chemical element.

At block 216, a total elemental time decay curve for a combination of the number of chemical elements, described in block 202 and visualized in FIGS. 4A-4B, is plotted. For example, with reference to FIG. 1, the computer 110 may plot this curve based on the total elemental gamma count. Referring to FIGS. 4A-4B, the total elemental time decay curves 405 and 425 comprise a sum across a combination of multiple elements in which the detectors have detected gamma ray emissions from. The detectors can be configured to detect gamma ray emissions of varying energies. As described above, the total elemental time decay curves 405, 425 can be skewed by an inclusion of chlorine and/or chlorides. However, while comprising skewed data, the total elemental decay curves 405, 425 can still provide valuable information in determining formation properties. Operations of the flowchart 200 continue at transition point A, which continue at transition point A of the flowchart 300 of FIG. 3.

From transition point A of the flowchart 300 of FIG. 3, operations continue at block 302.

At block 302, gamma ray emissions that are the result of the wellbore effect from the combination of the number of chemical elements are associated with a first total decay slope of the total elemental decay curve. For example, with reference to FIG. 1, the computer 110 can make this association. Referring to FIGS. 4A-4B, the total elemental decay curves 405, 425 comprise, from t=100 to approximately t=200, a first total decay slope in which a total elemental decay constant of the near field can be derived from.

At block 304, gamma ray emissions that are the result of the subsurface formation effect from the combination of the number of chemical elements are associated with a second elemental decay slope of the total elemental decay curve. For example, with reference to FIG. 1, the computer 110 can make this association. Referring to FIGS. 4A-4B, the total elemental decay curves 405, 425 comprise, after t=200, a second total decay slope in which a total elemental decay constant of the far field can be derived from.

At block 306, a total elemental decay constant across the combination of the number of chemical elements in the near field is determined based on the gamma ray emissions detected in the near field. For example, with reference to FIG. 1, the computer 110 can determine this near-field decay constant. Equation (1) is used to derive the decay constant, a, in regard to the first slope of one of the total elemental decay curves, comprising the gamma ray emission count across a pre-determined spectrum (range) of elements in which a user specified for analysis.

At block 308, a ratio of the single elemental decay constant of the far field to the total elemental decay constant of the near field is determined. For example, with reference to FIG. 1, the computer 110 can perform this operation. Regarding FIGS. 4A-4B, the ratio ("elemental decay ratio") can be determined by dividing the elemental decay constant of the far field of an element exclusive to the formation (example embodiments use silicon) by the total elemental decay constant of the near field detected by the near-field detector of the total count rate decay across all detected elements. This elemental decay ratio can be used to determine one or more subsurface formation properties.

To illustrate, FIGS. 5A-5C depict example plots of the elemental decay ratio plotted against formation porosity, wellbore salinity, and formation salinity, respectively, according to some embodiments. FIGS. 5A-5C include a y-axis 501 that is an elemental decay ratio of silicon. FIG. 5A further includes a plot 500 which comprises a monotonic trend 505 of the elemental decay ratio's linear relationship with formation porosity, and FIG. 5A includes an x-axis 502 that is formation porosity in porosity units (p.u.). FIG. 5B includes a plot 520 comprising an x-axis 503 that is wellbore salinity measured in thousand parts-per-million (kppm). FIG. 5C includes a plot 540 comprising an x-axis 504 that is formation salinity, also measured in kppm. The use of a formation-exclusive element in the elemental decay ratio can produce the monotonic trend 505 which may be used to estimate a formation porosity for any value of the aforementioned silicon elemental decay ratio, regardless of salinity (chlorine presence). For example, with reference to FIGS. 5A-5C, silicon is used as the formation-exclusive element. Silicon is unique to the formation matrix and formation fluid, i.e., not usually present in the wellbore, because the fluid occupying the wellbore (wellbore fluid) in either a wireline or LWD operation is often a water-based mud (WBM) or oil-based mud (OBM) dependent on operational necessities. WBM and OBM will naturally contain high concentrations of hydrogen, seeing as water is the primary component of WBM, and OBM contains hydrocarbons. WBM may comprise salts and various chlorides, but concentrations of these elemental species and the effect they have on resultant time decay data may be diminished through usage of the formation-exclusive element in the numerator of the ratio. The silicon elemental time decay curve has a unique signature that is independent of chlorine influence and provides more accurate results of elemental concentrations downhole. Therefore, the calculated far-field decay constant is also independent of chlorine influence. However, any formation-exclusive element that does not exist in the wellbore can be substituted for silicon. Decoupling of formation effects (Si far-field) from wellbore/salinity effects (total elemental decay of near field) results in salinity-independent porosity values. This is further described below.

Referring to FIGS. 5A-5B, while elemental decay ratio can be plotted against a multitude of varying factors, plots of the ratio against a formation porosity, wellbore salinity, and formation salinity, are shown. Data points, depicted by the blue circles in the plots, between the ratio and the salinity in the plots 520 and 540 do not correlate well with each other. However, the monotonic trend 505 emerges in the plot 500 wherein the formation porosity appears to increase in near linear fashion as the ratio increases. Thus, if the ratio is known for any one element over the total decay, a value of formation porosity, independent of salinity effects, can be determined. This salinity-independent formation porosity can be utilized to solve for a multitude of other formation properties at an increased level of accuracy.

In other embodiments, a salinity at any porosity value can be determined. For example, with reference to FIG. 5A, inverting a porosity equation allows for a monotonic trend between the elemental decay ratio and salinity to form, wherein a value of salinity can be solved for at any formation porosity value.

At block 310, a geophysical property of the subsurface formation is determined based on the ratio. For example, with reference to FIG. 1, the computer 110 can determine the property of the subsurface formation based on the ratio. The subsurface formation property or properties can be salinity independent since they are derived from the example elemental decay ratio of silicon above. Example formations properties that can be determined include a formation sigma, a water saturation ($S_w$), an oil saturation ($S_o$), porosity, etc. The formation sigma, or "sigma", is a macroscopic cross section of neutron absorption within the formation. Steep elemental time decay curves, and therefore larger decay constants in the near and far fields, correspond to a larger sigma value. For example, in FIG. 4, the near field (wellbore) will usually possess a larger formation sigma value than the far field because the wellbore is filled with fluid. Neutrons are captured at an immense rate as they propagate through the wellbore fluid, whereas a formation will normally comprise less fluid, i.e., a smaller cross-section in which neutrons will be captured by nuclei. Utilizing the elemental decay constant of a formation-exclusive element of the far field ratioed to the total elemental decay constant of the near field has advantages such as producing formation property values independent of salinity, and utilizing individual elemental time decay curves of individual elements provides further insight into decay behavior that traditional neutron logs comprising only a total elemental decay curve, thus only modeling total elemental decay behavior, do not possess. Water saturation, and thereby oil saturation if water saturation is known, can be calculated from the formation sigma.

At block 312, a decision to perform a downhole operation based on the geophysical property of the subsurface formation is determined. For example, with reference to FIG. 1, the computer 110 can make this determination. Based on the property of the subsurface formation, which may comprise that of porosity, water saturation, oil saturation, formation sigma, etc., a downhole operation can be performed, changed, stopped, etc. For example, in a hydraulic fracturing operation, one or more subsurface zones can be fractured based on a geophysical property determined based on the ratio of the single elemental decay to the total elemental decay. In another example, drilling operations (including direction, weight on bit, torque on the drill string, etc.) can be changed based on the determined geophysical property. If a downhole operation is to be performed, operations of the flowchart 300 continue at block 314. Otherwise, operations of the flowchart 300 are complete.

At block 314, the downhole operation is performed. For example, with reference to FIG. 1, the surface equipment 112 or logging system 108 may perform the downhole operation, depending on the type of operation to be completed.

Other Example System

Figure 6:
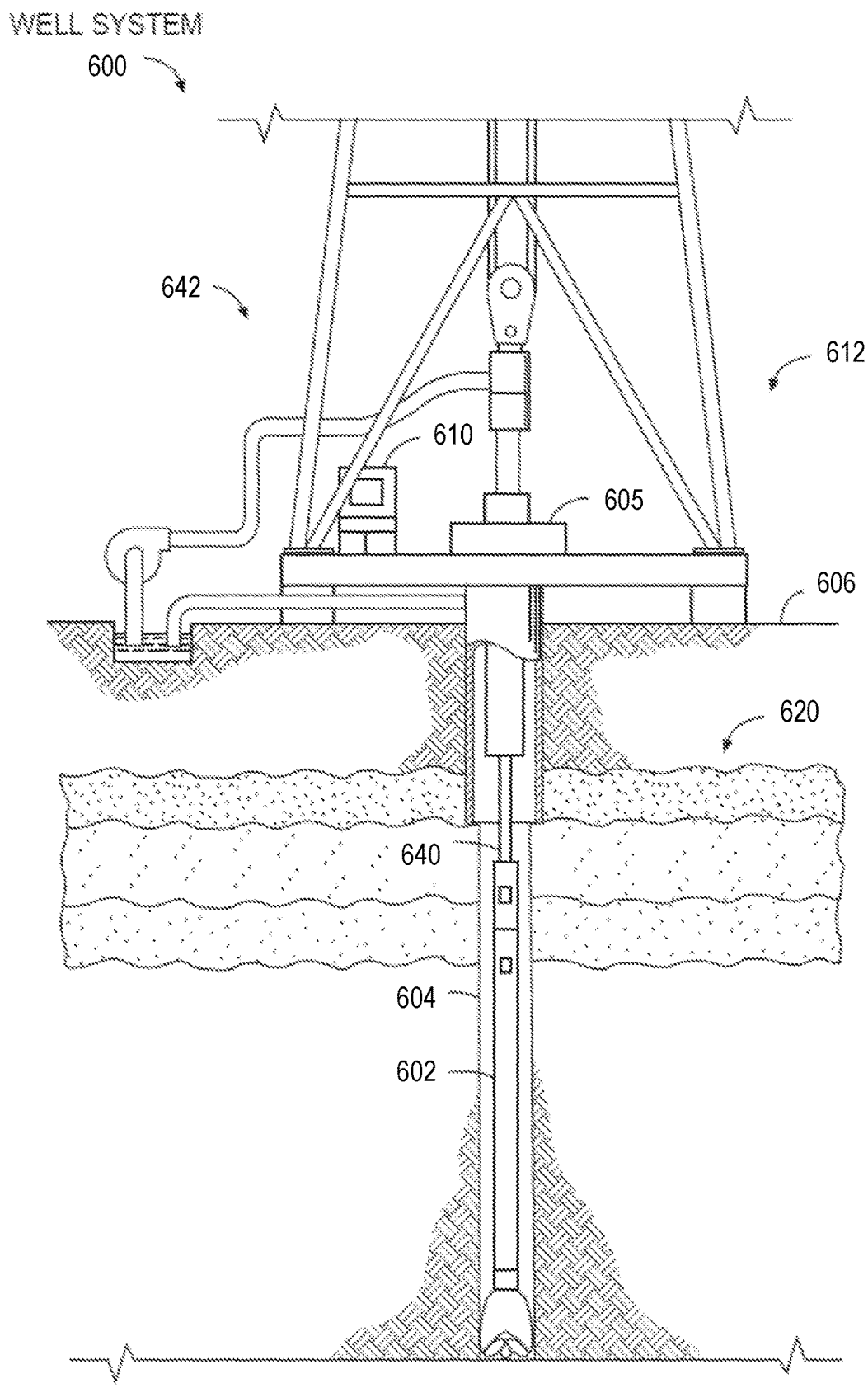
FIG. 6 depicts an example logging tool conveyed into a subsurface formation by means of a drill string, according to some embodiments.

FIG. 6 depicts a diagram of an example well system that includes a pulsed neutron logging tool in a logging while drilling (LWD) environment, according to various embodiments. In some examples, pulsed neutron logging operations are performed during drilling operations. Drilling is commonly carried out using a string of drill pipes connected together to form a drill string 640 that is lowered through a rotary table into the wellbore 604. In some cases, a drilling rig 642 at the surface 606 supports the drill string 640, as the drill string 640 is operated to drill a wellbore penetrating the subsurface formation 620. The drill string 640 may include, for example, a Kelly, drill pipe, a bottom hole assembly, and other components. The bottom hole assembly on the drill string may include drill collars, drill bits, the logging tool 602, and other components. The logging tools may include logging while drilling (LWD) tools and others. An example computer 610 can perform the same functions as the computer 110 of FIG. 1.

Example Computer

Figure 7:
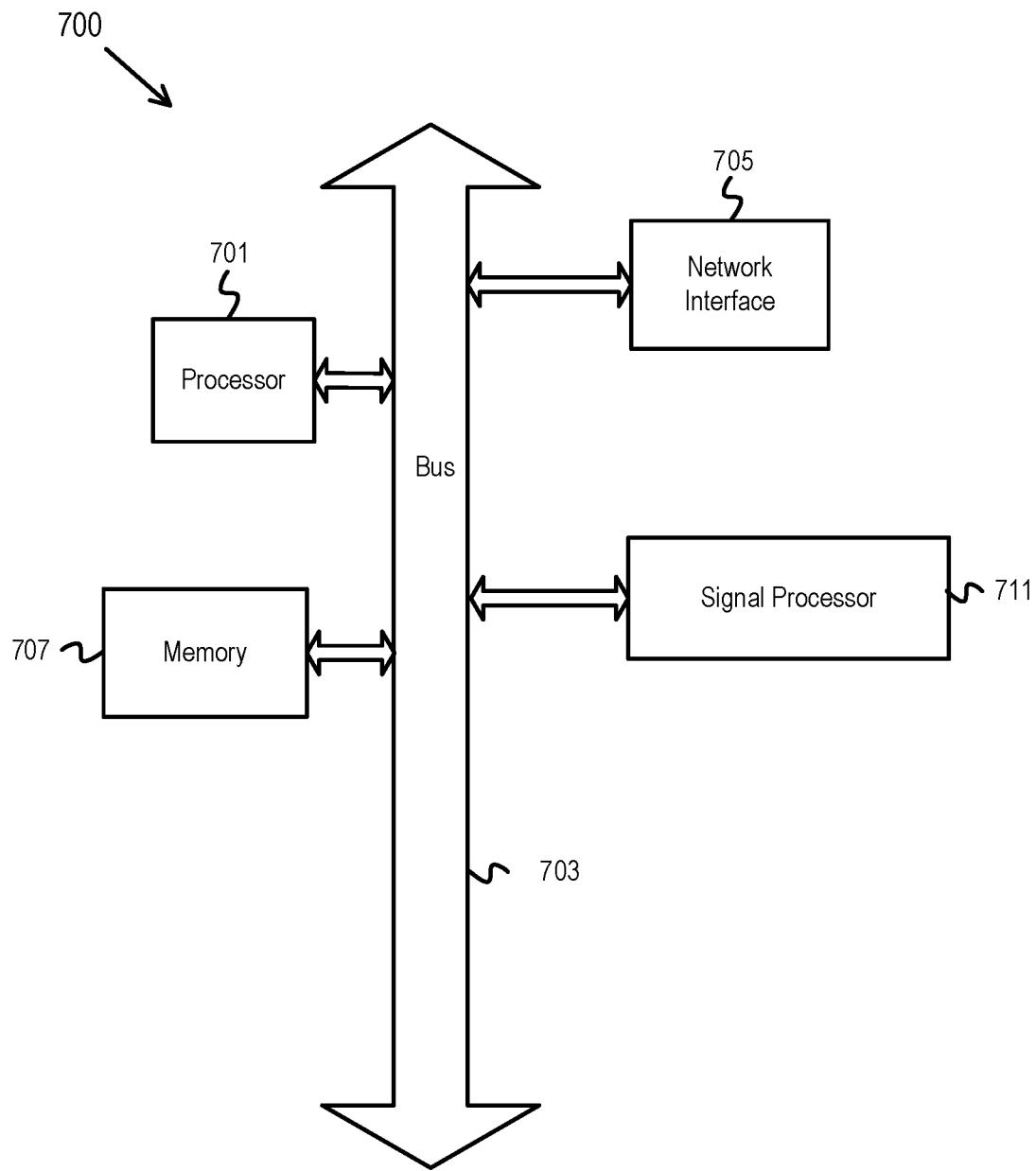
FIG. 7 depicts an example computer, according to some embodiments.

FIG. 7 depicts an example computer, according to some embodiments. A computer 700 includes a processor 701 (possibly including multiple processors, multiple cores, multiple nodes, and/or implementing multi-threading, etc.). The computer 700 includes a memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer 700 also includes a bus 703 (e.g., PCI, ISA, PCI-Express, HyperTransport® bus, Infini-Band® bus, NuBus, etc.) and a network interface 705 (e.g., a Fiber Channel interface, an Ethernet interface, an internet small computer system interface, SONET interface, wireless interface, etc.).

The computer 700 also includes a signal processor 711. The signal processor 711 can perform at least of a portion of the operations described herein. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

While the aspects of the disclosure are described with reference to various implementations and exploitations, it will be understood that these aspects are illustrative and that the scope of the claims is not limited to them. In general, techniques as described herein may be implemented with facilities consistent with any hardware system or hardware systems. Many variations, modifications, additions, and improvements are possible.

The flowchart is annotated with a series of numbers. These numbers represent stages of operations. Although these stages are ordered for this example, the stages illustrate one example to aid in understanding this disclosure and should not be used to limit the claims. Subject matter falling within the scope of the claims can vary with respect to the order and some of the operations. The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a computer or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing. The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

EXAMPLE EMBODIMENTS

Embodiment #1: A method comprising: emitting, from a transmitter positioned in a wellbore formed in a subsurface formation, a pulse of neutrons into the subsurface formation; detecting gamma ray emissions at a near field and a far field generated in response to the pulse of neutrons being emitted into the subsurface formation; determining a single elemental decay for one chemical element of a number of chemical elements present in the subsurface formation based on the gamma ray emissions; and determining at least one geophysical property of the subsurface formation based on the single elemental decay of the one chemical element.

Embodiment #2: The method of Embodiment 1, further comprising: determining a single element far-field decay of the one chemical element in the far field based on the gamma ray emissions detected in the far field; determining a total element decay across the number of chemical elements in the near field based on the gamma ray emissions detected in the near field; and determining a ratio of the single element far-field decay to the total element decay; and wherein determining the at least one geophysical property comprises determining the at least one geophysical property based on the ratio.

Embodiment #3: The method of Embodiment 2, wherein determining the single element far-field decay of the one chemical element in the far field comprises: differentiating between gamma ray emissions that are a result of a wellbore effect from the one chemical element in the wellbore and gamma ray emissions that are a result of a subsurface formation effect from the one chemical element in the subsurface formation.

Embodiment #4: The method of Embodiment 3, wherein the differentiating comprises: plotting a single elemental time decay curve for the one chemical element; and associating the gamma ray emissions that are the result of the wellbore effect from the one chemical element based on a first, near-field elemental decay slope of the single elemental time decay curve; and associating the gamma ray emissions that are the result of the subsurface formation effect from the one chemical element based on a second, far-field elemental decay slope of the single elemental time decay curve.

Embodiment #5: The method of Embodiment 4, wherein the first, near-field elemental decay slope is of a greater magnitude than the second, far-field elemental decay slope.

Embodiment #6: The method of any one of Embodiments 2-5, wherein determining the total elemental decay of the number of chemical elements in the near field comprises: differentiating between gamma ray emissions that are a result of a wellbore effect for a combination of the number of chemical elements in the wellbore and gamma ray emissions that are a result of a subsurface formation effect for the combination of the number of chemical elements in the subsurface formation.

Embodiment #7: The method of Embodiment 6, wherein the differentiating comprises: plotting a total elemental time decay curve for the combination of the number of chemical elements; and associating the gamma ray emissions that are the result of the wellbore effect from the combination of the number of chemical elements based on a first, near-field slope of the total elemental time decay curve; and associating the gamma ray emissions that are the result of the subsurface formation effect from the combination of the number of chemical elements based on a second, far-field slope of the total elemental time decay curve.

Embodiment #8: The method of any one of Embodiments 1-7, wherein determining the at least one geophysical property of the subsurface formation comprises determining a porosity of the subsurface formation.

Embodiment #9: The method of any one of Embodiments 1-8, wherein determining the at least one geophysical property of the subsurface formation comprises determining a sigma of the subsurface formation.

Embodiment #10: The method of any one of Embodiments 1-8, wherein the one chemical element comprises a chemical element present in the subsurface formation but essentially not present in the wellbore.

Embodiment #11: The method of any one of Embodiments 1-10, wherein determining the at least one geophysical property of the subsurface formation comprises determining the at least one geophysical property of the subsurface formation absent of salinity effects.

Embodiment #12: A system comprising: a downhole tool to be conveyed in a wellbore formed in a subsurface formation, wherein the downhole tool comprises, at least one neutron source configured to, emit a neutron pulse into the subsurface formation; a near-field gamma ray detector and a far-field gamma ray detector positioned on the downhole tool, wherein the near-field gamma ray detector and the far-field gamma ray detector are configured to, detect gamma ray emissions generated in response to the neutron pulse being emitted into the subsurface formation; a processor; and a machine-readable medium having program code executable by the processor to cause the processor to, determine a single elemental decay for one chemical element of a number of chemical elements present in the subsurface formation based on the gamma ray emissions; and determine at least one geophysical property of the subsurface formation based on the single elemental decay of the one chemical element.

Embodiment #13: The system of Embodiment 12, wherein the program code comprises program code executable by the processor to cause the processor to, determine a single element far-field decay of the one chemical element in a far field based on the gamma ray emissions detected in the far field; determine a total element decay across the number of chemical elements in a near field based on the gamma ray emissions detected in the near field; and determine a ratio of the single element far-field decay to the total element decay; and wherein program code to determine the at least one geophysical property comprises program code to determine the at least one geophysical property based on the ratio.

Embodiment #14: The system of Embodiment 13, wherein the program code comprises program code executable by the processor to cause the processor to, differentiate between gamma ray emissions that are a result of a wellbore effect from the one chemical element in the wellbore and gamma ray emissions that are a result of a subsurface formation effect from the one chemical element in the subsurface formation.

Embodiment #15: The system of Embodiment 14, wherein the program code executable by the processor to cause the processor to differentiate comprises program code executable by the processor to cause the processor to, plot a single elemental time decay curve for the one chemical element; associate the gamma ray emissions that are the result of the wellbore effect from the one chemical element based on a first, near-field elemental decay slope of the single elemental time decay curve; and associate the gamma ray emissions that are the result of the subsurface formation effect from the one chemical element based on a second, far-field elemental decay slope of the single elemental time decay curve.

Embodiment #16: The system of any one of Embodiments 13-15, wherein the program code comprises program code executable by the processor to cause the processor to, differentiate between gamma ray emissions that are a result of a wellbore effect for a combination of the number of chemical elements in the wellbore and gamma ray emissions that are a result of a subsurface formation effect for the combination of the number of chemical elements in the subsurface formation.

Embodiment #17: The system of Embodiment 16, wherein the program code executable by the processor to cause the processor to differentiate comprises program code executable by the processor to cause the processor to, plot a total elemental time decay curve for the combination of the number of chemical elements; and associate the gamma ray emissions that are the result of the wellbore effect from the combination of the number of chemical elements based on a first, near-field slope of the total elemental time decay curve; and associate the gamma ray emissions that are the result of the subsurface formation effect from the combination of the number of chemical elements based on a second, far-field slope of the total elemental time decay curve.

Embodiment #18: One or more non-transitory machine-readable media comprising program code executable by a processor to cause the processor to: emit, from a transmitter positioned in a wellbore formed in a subsurface formation, a pulse of neutrons into the subsurface formation; detect gamma ray emissions at a near field and a far field generated in response to the pulse of neutrons being emitted into the subsurface formation; determine a single elemental decay for one chemical element of a number of chemical elements present in the subsurface formation based on the gamma ray emissions; and determine at least one geophysical property of the subsurface formation based on the single elemental decay of the one chemical element.

Embodiment #19: The one or more non-transitory machine-readable media of Embodiment 18, wherein the program code comprises program code executable by the processor to cause the processor to, determine a single element far-field decay of the one chemical element in the far field based on the gamma ray emissions detected in the far field; determine a total element decay across the number of chemical elements in the near field based on the gamma ray emissions detected in the near field; and determine a ratio of the single element far-field decay to the total element decay; and wherein the program code to determine the at least one geophysical property comprises program code to determine the at least one geophysical property based on the ratio.

Embodiment #20: The one or more non-transitory machine-readable media of Embodiment 19, wherein the program code comprises program code executable by the processor to cause the processor to, differentiate between gamma ray emissions that are a result of a wellbore effect for a combination of the number of chemical elements in the wellbore and gamma ray emissions that are a result of a subsurface formation effect for the combination of the number of chemical elements in the subsurface formation.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
    emitting, from a transmitter positioned in a wellbore formed in a subsurface formation, a pulse of neutrons into the subsurface formation;
    detecting gamma ray emissions at a near field and a far field generated in response to the pulse of neutrons being emitted into the subsurface formation;
    determining a single elemental time decay curve for one chemical element of a number of chemical elements present in the subsurface formation based on the gamma ray emissions;
    determining elemental decay slopes of the single elemental time decay curve; and
    determining at least one geophysical property of the subsurface formation based on the elemental decay slopes and the single elemental time decay curve of the one chemical element.

2. The method of claim 1, further comprising:
    determining a single element far-field decay of the one chemical element in the far field based on the gamma ray emissions detected in the far field;
    determining a total element decay across the number of chemical elements in the near field based on the gamma ray emissions detected in the near field; and
    determining a ratio of the single element far-field decay to the total element decay; and
    wherein determining the at least one geophysical property comprises determining the at least one geophysical property based on the ratio.

3. The method of claim 2, wherein determining the single element far-field decay of the one chemical element in the far field comprises:
    differentiating between gamma ray emissions that are a result of a wellbore effect from the one chemical element in the wellbore and gamma ray emissions that are a result of a subsurface formation effect from the one chemical element in the subsurface formation.

4. The method of claim 3, wherein the differentiating comprises:
    plotting the single elemental time decay curve for the one chemical element; and
    associating the gamma ray emissions that are the result of the wellbore effect from the one chemical element based on a first, near-field elemental decay slope of the single elemental time decay curve; and
    associating the gamma ray emissions that are the result of the subsurface formation effect from the one chemical element based on a second, far-field elemental decay slope of the single elemental time decay curve.

5. The method of claim 4, wherein the first, near-field elemental decay slope is of a greater magnitude than the second, far-field elemental decay slope.

6. The method of claim 2, wherein determining the total elemental decay of the number of chemical elements in the near field comprises:
    differentiating between gamma ray emissions that are a result of a wellbore effect for a combination of the number of chemical elements in the wellbore and gamma ray emissions that are a result of a subsurface formation effect for the combination of the number of chemical elements in the subsurface formation.

7. The method of claim 6, wherein the differentiating comprises:
    plotting a total elemental time decay curve for the combination of the number of chemical elements; and
    associating the gamma ray emissions that are the result of the wellbore effect from the combination of the number of chemical elements based on a first, near-field slope of the total elemental time decay curve; and
    associating the gamma ray emissions that are the result of the subsurface formation effect from the combination of the number of chemical elements based on a second, far-field slope of the total elemental time decay curve.

8. The method of claim 1, wherein determining the at least one geophysical property of the subsurface formation comprises determining a porosity of the subsurface formation.

9. The method of claim 1, wherein determining the at least one geophysical property of the subsurface formation comprises determining a sigma of the subsurface formation.

10. The method of claim 1, wherein the one chemical element comprises a chemical element present in the subsurface formation but essentially not present in the wellbore.

11. The method of claim 1, wherein determining the at least one geophysical property of the subsurface formation comprises determining the at least one geophysical property of the subsurface formation absent of salinity effects.

12. A system comprising:
    a downhole tool to be conveyed in a wellbore formed in a subsurface formation,
    wherein the downhole tool comprises,
        at least one neutron source configured to,
            emit a neutron pulse into the subsurface formation;
        a near-field gamma ray detector and a far-field gamma ray detector positioned on the downhole tool, wherein the near-field gamma ray detector and the far-field gamma ray detector are configured to,
            detect gamma ray emissions generated in response to the neutron pulse being emitted into the subsurface formation;
    a processor; and
    a machine-readable medium having program code executable by the processor to cause the processor to,
        determine a single elemental time decay curve for one chemical element of a number of chemical elements present in the subsurface formation based on the gamma ray emissions;

determine elemental decay slopes of the single elemental time decay curve; and determine at least one geophysical property of the subsurface formation based on the elemental decay slopes and the single elemental time decay curve of the one chemical element.

13. The system of claim 12, wherein the program code comprises program code executable by the processor to cause the processor to, determine a single element far-field decay of the one chemical element in a far field based on the gamma ray emissions detected in the far field;

determine a total element decay across the number of chemical elements in a near field based on the gamma ray emissions detected in the near field; and determine a ratio of the single element far-field decay to the total element decay; and wherein program code to determine the at least one geophysical property comprises program code to determine the at least one geophysical property based on the ratio.

14. The system of claim 13, wherein the program code comprises program code executable by the processor to cause the processor to, differentiate between gamma ray emissions that are a result of a wellbore effect from the one chemical element in the wellbore and gamma ray emissions that are a result of a subsurface formation effect from the one chemical element in the subsurface formation.

15. The system of claim 14, wherein the program code executable by the processor to cause the processor to differentiate comprises program code executable by the processor to cause the processor to, plot the single elemental time decay curve for the one chemical element;

associate the gamma ray emissions that are the result of the wellbore effect from the one chemical element based on a first, near-field elemental decay slope of the single elemental time decay curve; and associate the gamma ray emissions that are the result of the subsurface formation effect from the one chemical element based on a second, far-field elemental decay slope of the single elemental time decay curve.

16. The system of claim 13, wherein the program code comprises program code executable by the processor to cause the processor to, differentiate between gamma ray emissions that are a result of a wellbore effect for a combination of the number of chemical elements in the wellbore and gamma ray emissions that are a result of a subsurface formation effect for the combination of the number of chemical elements in the subsurface formation.

17. The system of claim 16, wherein the program code executable by the processor to cause the processor to differentiate comprises program code executable by the processor to cause the processor to, plot a total elemental time decay curve for the combination of the number of chemical elements; and associate the gamma ray emissions that are the result of the wellbore effect from the combination of the number of chemical elements based on a first, near-field slope of the total elemental time decay curve; and associate the gamma ray emissions that are the result of the subsurface formation effect from the combination of the number of chemical elements based on a second, far-field slope of the total elemental time decay curve.

18. One or more non-transitory machine-readable media comprising program code executable by a processor to cause the processor to:

emit, from a transmitter positioned in a wellbore formed in a subsurface formation, a pulse of neutrons into the subsurface formation;

detect gamma ray emissions at a near field and a far field generated in response to the pulse of neutrons being emitted into the subsurface formation;

determine a single elemental time decay curve for one chemical element of a number of chemical elements present in the subsurface formation based on the gamma ray emissions;

determine elemental decay slopes of the single elemental time decay curve; and determine at least one geophysical property of the subsurface formation based on the elemental decay slopes and the single elemental time decay curve of the one chemical element.

19. The one or more non-transitory machine-readable media of claim 18, wherein the program code comprises program code executable by the processor to cause the processor to, determine a single element far-field decay of the one chemical element in the far field based on the gamma ray emissions detected in the far field;

determine a total element decay across the number of chemical elements in the near field based on the gamma ray emissions detected in the near field; and determine a ratio of the single element far-field decay to the total element decay; and wherein the program code to determine the at least one geophysical property comprises program code to determine the at least one geophysical property based on the ratio.

20. The one or more non-transitory machine-readable media of claim 19, wherein the program code comprises program code executable by the processor to cause the processor to, differentiate between gamma ray emissions that are a result of a wellbore effect for a combination of the number of chemical elements in the wellbore and gamma ray emissions that are a result of a subsurface formation effect for the combination of the number of chemical elements in the subsurface formation.

* * * * *